F. F. REYNOLDS.
Plow.
No. 3,708. Reissued Nov. 2, 1869.
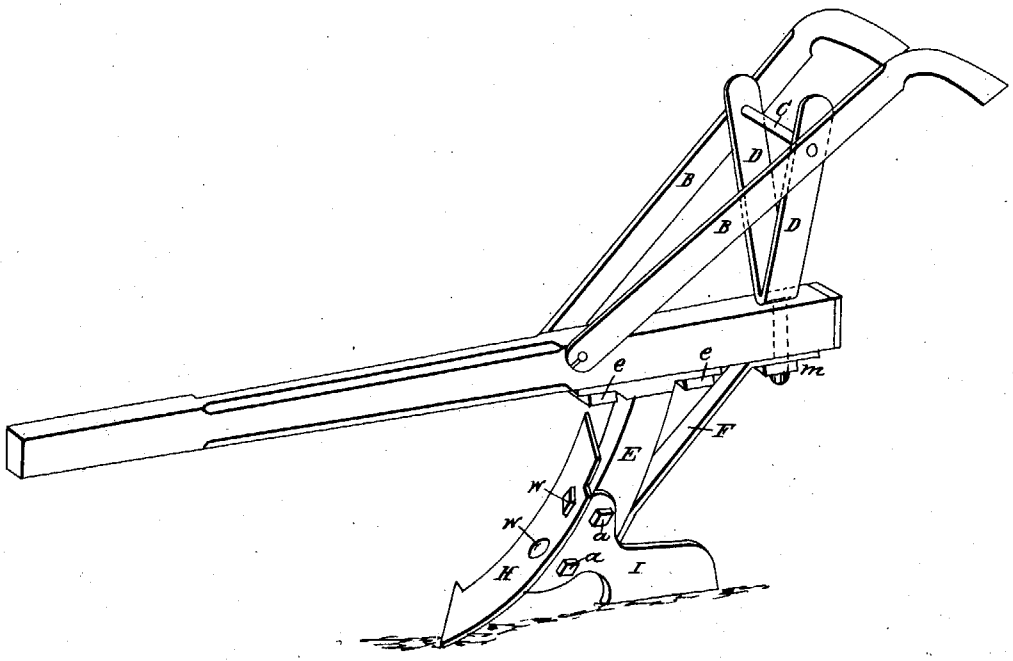
Witnesses:
C. A. Pettit
A. M. Tanner.
Inventors:
Reynolds and Hines,
by Munn & Co.
attorneys.
N. PETERS. Photo-Lithographer. Washington. D. C.

UNITED STATES PATENT OFFICE.

FREEMAN F. REYNOLDS, OF BETHANY, FOR HIMSELF, AND JOSEPH H. HINES, OF DAVISBOROUGH, GEORGIA, ASSIGNEE OF FREEMAN F. REYNOLDS.

IMPROVEMENT IN PLOWS.

Specification forming part of Letters Patent No. 60,938, dated January 1, 1867; Reissue No. 3,708, dated November 2, 1869.

*To all whom it may concern:*

Be it known that FREEMAN F. REYNOLDS, of Bethany, in the county of Jefferson and State of Georgia, invented a new and Improved Plow; and we do hereby declare that the following is a full, clear, and exact description of the construction and operation of the same, reference being had to the accompanying drawing, making a part of this specification, in which the invention is represented by a perspective view.

In this invention the landside is constructed in a novel manner and attached to the side of the standard by bolts, and a new method of bracing said standard is adopted, the object of the whole arrangement being to increase the strength and compactness of the working parts, and to enable the improved landside to be applied to any of the ordinary plows now in use.

In the drawing, A represents the plow-beam; B B, the handles; C, a round connecting the handles; D D, standards supporting the handles, and consisting of a bent metallic bar bolted through the bent part to the rear end of the plow-beam, and attached at both extremities to the round C or the handles; E, the curved plow standard or helve, attached to the under side of the beam by means of bolts *e e*, extending up through flanges cast on its upper end; F, an inclined brace, bolted at its lower end to the heel of the standard E by means of bolts *w w* and at its upper end to the under side of the plow-beam by means of a single bolt, *m;* H, the curved mold-board or share of the plow, attached to the standard or helve E by means of the bolts *w w*, which also fasten the brace to the standard; and I the landside or guide-bar, constructed substantially in the form shown in the drawing, and bolted to the side of the helve or standard by means of one or more bolts, *a a*. The landside thus constructed and applied serves both as a rudder to guide the plow and a fulcrum upon which to raise or lower the plow-point. Its lower edge, along the straight portion near the rear end, may be cast a little thicker than the rest to insure sufficient strength and prevent its cutting into the ground too easily when bearing the weight of the plow. Its front edge is curved to fit and support the rear side of the share, which in turn serves to hold the landside in place and save the necessity of more than one bolt *a*, except in large plows.

This invention is not, however, confined to any particular form of landside or guide-bar, or of standard, share, or brace, the main feature of the invention consisting in making the landside of any shape which will adapt it to be attached to the side of the standard by bolts, and securing it in position in that manner.

What is claimed therefore as new, and desired to be secured by Letters Patent, is—

1. Attaching the landside or guide-bar to the side of the standard by means of one or more bolts, *a a*, substantially as and for the purposes specified.

2. In connection with the standard E and beam A, the brace F, arranged as described, and connected to the share by bolts *w w* and to the beam by a single bolt, *m*, substantially as and for the purposes set forth.

3. The combination of the parts E H I F, when bolted together and fastened to the beam, substantially in the manner described and shown, and for the purposes indicated.

FREEMAN F. REYNOLDS.
JOSEPH H. HINES.

Witnesses:
J. R. MURPHY,
C. S. WISE.